United States Patent [19]
Matsuzaki et al.

[11] 4,079,975
[45] Mar. 21, 1978

[54] BUMPER CONSTRUCTION

[75] Inventors: Kiyoto Matsuzaki; Nobuo Ohkubo, both of Yokohama, Japan

[73] Assignee: Nissan Motor Company, Ltd., Japan

[21] Appl. No.: 723,244

[22] Filed: Sep. 15, 1976

[30] Foreign Application Priority Data

Sep. 20, 1975  Japan .............................. 50-114528

[51] Int. Cl.² .......................................... B60R 19/00
[52] U.S. Cl. ....................................... 293/98; 293/89
[58] Field of Search .......... 243/60, 70, 71 R, DIG. 3, 243/98, 99, 96, 89

[56] References Cited

U.S. PATENT DOCUMENTS

| D 160,880 | 11/1950 | O'Leary | 293/60 |
|---|---|---|---|
| 1,898,229 | 2/1933 | Veale | 293/98 |
| 3,290,282 | 12/1966 | Fritsch | 293/71 R |
| 3,427,062 | 2/1969 | Struben | 293/70 |
| 3,437,367 | 4/1969 | Blank | 293/DIG. 3 |
| 3,494,607 | 2/1970 | Rusch | 293/71 R |
| 3,779,592 | 12/1973 | Golze | 293/98 |
| 3,827,740 | 8/1974 | Golze | 293/98 |
| 3,909,053 | 9/1975 | Koch | 293/98 |

FOREIGN PATENT DOCUMENTS 1,381,174  1/1975  United Kingdom .................. 293/70

Primary Examiner—Trygve M. Blix
Assistant Examiner—D. W. Keen

[57] ABSTRACT

An elongated channel member having a pair of elongated flange portions at its leg portions for increasing the mechanical strength thereof is used as a vehicle bumper.

2 Claims, 10 Drawing Figures

BUMPER CONSTRUCTION

The present invention relates in general to a safety device for a motor vehicle and more particularly to a bumper construction having an increased mechanical strength with simple structure.

It is an object of the present invention to provide an improved bumper construction which can be manufactured in a relatively inexpensive manner yet assures adequate protection of the motor vehicle.

It is another object of the present invention to provide a bumper construction of the character mentioned above which is considerably light in weight and nevertheless has an increased mechanical strength.

It is still another object of the present invention to provide a bumper construction for a motor vehicle comprising an elongated channel member including substantially parallel side wall portions and a base wall portion which are arranged to define therebetween a channel longitudinally extending throughout the whole length thereof, each of the side wall portions being provided with an elongated free end which terminates at an open end of the channel member; an elongated flange member firmly fixed to each of the elongated free end so as to extend along the corresponding side wall portion; and first means for connecting the elongated channel member to an end portion of the motor vehicle.

Other objects and advantages of the present invention will be more apparent from the following description when taken in conjunction with the accompanying drawings, in which.

Prior to describing the construction of the bumper construction of the present invention, an explanation of the prior art bumpers illustrated in FIGS. 2A and 2B will be made in order to make clear the inventive steps of the invention.

Figure 1:
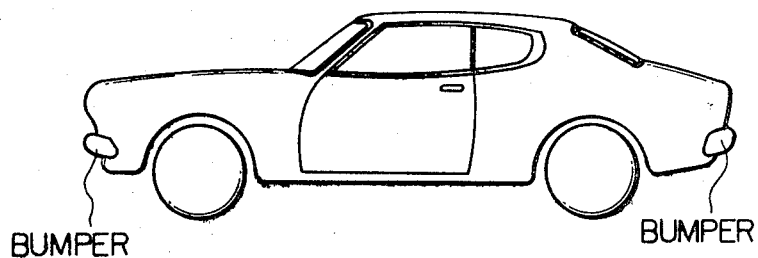
FIG. 1 is a sketch of a motor vehicle equipped at its front and rear ends with bumper constructions according to the present invention.
Figure 2A:
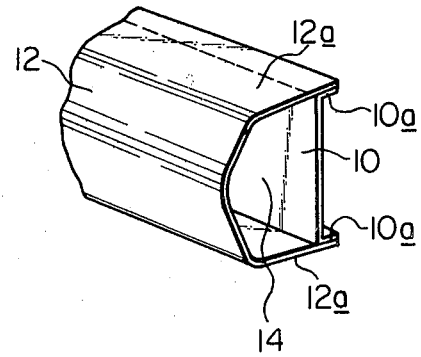
FIGS. 2A and 2B are perspective views of two kinds of prior art bumper constructions.
Figure 2B:
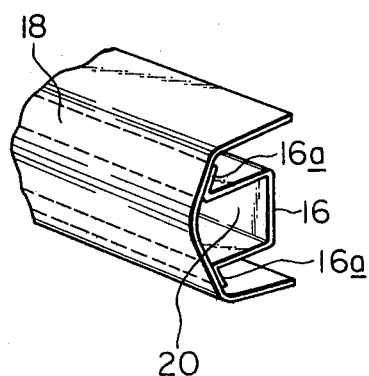

In these FIGS. 2A and 2B, there are shown two kinds of prior art bumpers which are so constructed not to be damaged or deformed by impacts or blows of limited intensity. The bumper construction illustrated in FIGS. 2A comprises an elongated inner plate member 10 connected through usual bumper stays (not shown) or any shock absorbing members to the front or rear body structure of the vehicle, and an elongated channel member 12 having a generally U-shaped cross section. As shown, the inner plate member 10 has at its upper and lower ends flange portions 10a which are firmly welded or otherwise fastened to leg portions 12a of the channel member 12 so that an elongated closed space 14 is defined by them throughout the whole length of the inner plate member 10. On the other hand, the bumper construction if FIG. 2B comprises an elongated inner channel member 16 having a generally U-shaped cross section, and an elongated outer channel member 18 with a generally U-shaped cross section which is larger in size than that of the inner channel member 16. The inner channel member 16 is disposed in the outer channel member so that flanges 16a formed of the leg portions of the inner channel member 16 are welded or otherwise fastened to inner surfaces of the outer channel member 18 to define therebetween an elongate closed space 20 longitudinally extending throughout the whole length of the inner channel member 16.

Bumper designs in which elongated closed spaces of essentially boxed liked construction, as known in the prior art, produce increased resistance to a crushing load acting generally perpendicular to the longitudinal axis of the bumper construction.

However, in these prior art cases, there will inevitably occur the following drawbacks, that is, the weight of the bumper construction is remarkably increased by the provision of the elongated inner plate member 10 or the elongated inner channel member 16 which is so constructed to extend throughout generally whole length of the elongated outer channel member 12 or 18. This means that these bumper constructions are costly to manufacture. Furthermore, the inner surfaces of the bumper construction defining the elongated space 14 or 20 are difficult to plate during conventional metal plating operations, due to the obstruction of the elongated space against the introduction of the electrolyte into the space. The failure of the metal plating will cause the gathering of rust on the bumper construction with a result that the strength of the bumper construction is weakened considerably as is well known in the art.

Accordingly, the present invention is proposed to eliminate the above-mentioned drawbacks encountered in the prior art bumper constructions.

Figure 3:
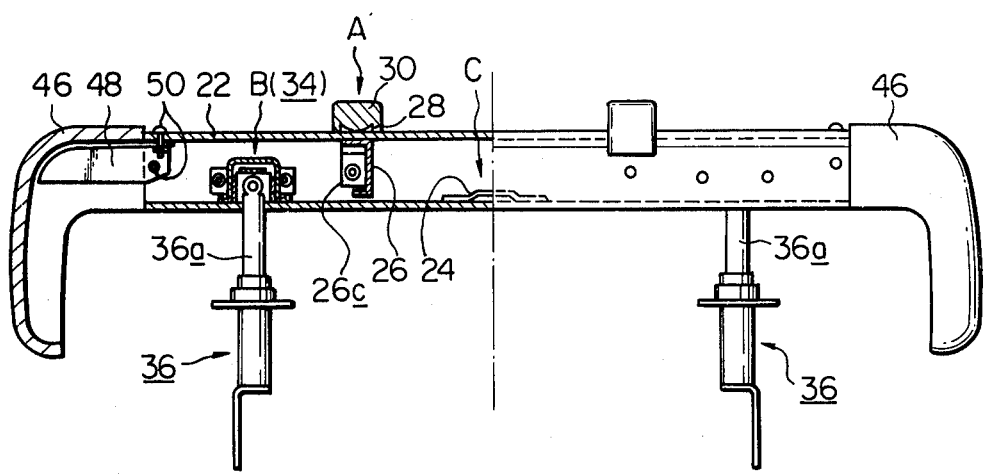
FIG. 3 is a partially cutway view of a bumper construction according to the present invention.

Referring now to FIG. 3, there is shown a bumper construction according to the present invention.

Figure 4:
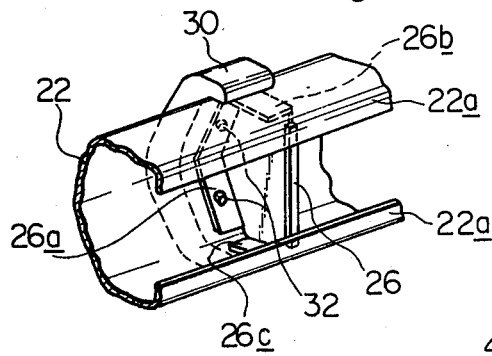
FIGS. 4 to 6 are enlarged partial views of parts indicated by respective arrows A, B and C carried on FIG. 3.
Figure 5:
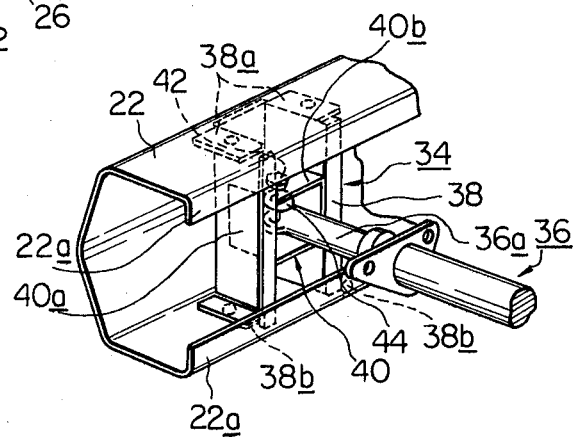
Figure 6:
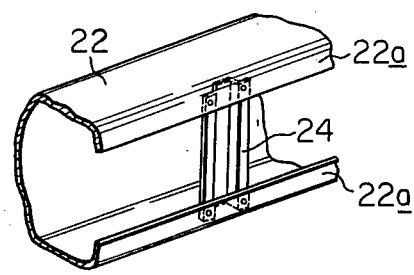

Portions indicated by the references A, B and C in this drawings are well shown in detail in FIGS. 4 to 6, respectively. In FIG. 3, an elongated outer channel member made of steel and having a generally U-shaped cross section is designated by the reference numeral 22. The member 22 is provided at its both leg portions with flange portions 22a which extend in the direction to face to each other, as well seen in FIG. 4. If desired, the flange portions 22a may so constructed to extend in the direction to separate from each other or otherwise in the same direction.

A retaining steel plate member 24 is firmly welded or otherwise fastened at its both ends to the flange portions 22a at a generally longitudinally central portion of the outer channel member 22. With the provision of this retaining plate member 24, the opening movements of the leg portions of the outer channel member 22 will be prevented even in a case that the bumper construction is subjected to a certain magnitude of impact.

Within the outer channel member 22 are disposed steel partition members 26 at positions near the retaining plate member 24. As well shown in FIG. 4, each of the partition members 26 is provided at its periphery with flanges 26a, 26b and 26c which are welded or otherwise fastened to the inner surfaces of the outer channel member 22. Mounted on the outer surfaces of the outer channel member 22 through respective holders 28 are generally C-shaped cushion members 30 which are made of resilient material such are rubber and/or urethane. These cushion members 30 are located at positions to substantially embrace the corresponding partition members 26 as shown. The connection of the holders 28 with the outer channel member 22 is made by suitable numbers of stud bolts 32 which are extended from the flanges 26a of the partition members 26.

Adjacent the longitudinal ends and within the outer channel member 22 are equipped a pair of bracket means 34 which are used for connecting the bumper proper to shock absorbing members 36 fixed to the front or rear body structure of the motor vehicle. As well illustrated in FIG. 5, each of the bracket means 34 comprises a base member 38, of a steel, having a generally U-shaped cross section and having at both longitudinal ends flanges 38a and 38b which are respectively welded or otherwise fastened to the inner surfaces of the leg portions of the outer channel member 22. Firmly disposed in the space defined in the base member 38 is a box member 40 which has two side walls 40a welded or otherwise fastened to the inner surfaces of the leg portions of the base member 38, and upper and lower walls 40b respectively formed with through holes (no numerals) through which a bolt 42 is passed for the reason which will be explained next.

Each of the shock absorbing members 36 is provided at its piston 36a with a ring portion 44 through which the above-mentioned bolt 42 is passed for the connection of the bumper construction with the shock absorbing members 36.

Referring again to FIG. 3, there are also shown a pair of side bumpers 46, made of resilient material such as rubber and/or urethane, which are equipped to the longitudinal ends of the outer channel member 22 through brackets 48 and bolts 50.

Figure 7A:
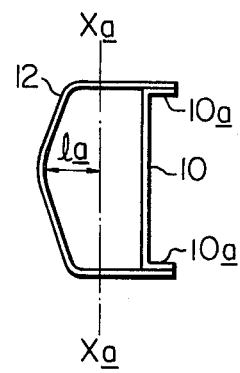
FIGS. 7A, 7B and 7C are sectional views of three kinds of bumper constructions, in which respective neutral axes are shown.
Figure 7B:
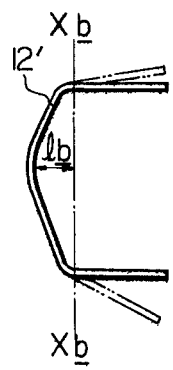
Figure 7C:
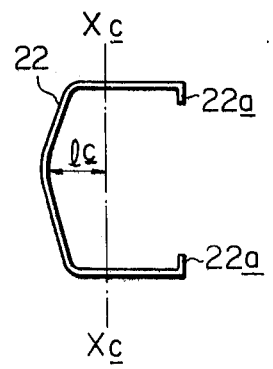

For the purpose of explaining the reason why the bumper construction according to the present invention has the increased mechanical strength, there are prepared sectional views of three kinds of bumper constructions in FIGS. 7A, 7B and 7C, in which the bumper constructions of FIGS. 7A and 7B are conventional ones and the bumper construction of 7C is one of the invention. The bumper construction illustrated in FIG. 7A is the same as shown in FIG. 2A and comprises, as well described before, the outer channel member 12 and the flat inner plate member 10 which is disposed between the leg portions of the outer channel member 12 through its flange portions 10a. On the other hand, the bumper construction of FIG. 7B comprises only the outer channel member 12', without using the inner plate member. The bumper construction in FIG. 7C, according to the invention, comprises the outer channel member 22 which is similar in cross sectional configuration to FIG. 7B except for the flange portions 22a. Phantom lines respectively indicated by $Xa - Xa$, $Xb - Xb$ and $Xc - Xc$ are neutral axes to the corresponding bumper constructions. From these constructions, it will be appreciated that neutral axes are located in a manner to satisfy the relation $lb < lc < la$ where each of the $la$, $lb$ and $lc$ represents the distance between the top end portion of each outer channel member and the corresponding neutral axis as shown in the drawings. It is apparent from the above that the bumper construction illustrated in FIG. 7C has a modulus of section considerably larger than that of the one illustrated in FIG. 7B, although the one of FIG. 7A has the largest among them. Consequently, the bumper construction according to the present invention becomes to have an increased mechanical strength only by the provision of the flange portions. Of course, the strength or the flexural rigidity of the subject bumper construction will be more effectively increased when the reinforcing means such as the retaining plate member 24, the partition member 26 and the base mbmer 38 are equipped thereto in the manner as described hereinbefore. Especially, the provision of the partition member 26 into the outer channel member 22 will bring about an increased torsional rigidity to the bumper construction. Furthermore, if the partition member 26 is located adjacent the ends of the outer channel member 22, the torsional rigidity of the bumper construction will be even more greatly increased.

Thus, it will be apparent that the bumper construction of the present invention can be made relatively light in weight and nevertheless has an increased mechanical strength sufficient to protect the vehicle body proper in case of collision. Furthermore, the subject bumper construction is manufactured in a relatively inexpensive manner due to its simplicity.

Although, in the above description, the connection of the bumper proper to the shock absorbing member 36. is made through bracket means 34, it is also possible to use the partition member 26 in stead of the bracket means 34. In this case, the leading end of the piston member 36a is connected to the partition member 26, preferably by welding.

What is claimed is:

1. A bumper arrangement for the end portion of a motor vehicle, comprising: an elongated channel member including a base wall portion and a pair of substantially parallel side wall portions which are arranged to define therebetween a channel longitudinally extending throughout the entire length thereof, each of said side wall portions being provided with a longitudinally elongated free end which terminates at an open end of said channel member; a pair of flange members integrally and respectively connected to said elongated free ends of the side wall portions to extend substantially parallel to said base wall portion and spaced in proximal relationship with each other; at least one retaining plate member having two ends vertically disposed in said channel member and firmly fixed to said channel member only at said flange members; at least one partition member fixedly retained in a portion of the channel of said channel member to traverse the hollow space of said portion, said partition member having at the periphery thereof flanges firmly fixed to the inner surfaces of said base and side wall portions of said channel member; and means for connecting said elongated channel member to said end portion of said motor vehicle to allow the outer surface of said flange members to face said end portion of said vehicle, said means including bracket means firmly disposed in said channel member, and a shock absorbing member having one end connected to said bracket means and the other end connected to said end portion of said motor vehicle, said bracket means including a base member having a generally U-shaped cross section and firmly disposed in said channel member such that the free ends of leg portions of said base member face to said end portion of said motor vehicle, a box member firmly disposed in said base member and having two side walls respectively firmly attached to said leg portions of said base member and having upper and lower walls respectively formed with through holes which are aligned with each other, a bolt member passing through said through holes, and a ring member having an opening through which said bolt member is passed, said ring member being connected to the one end of said shock absorbing member.

2. A bumper arrangement as claimed in claim 1, further comprising a cushion member which is made of resilient material and is arranged to partially embrace an outer surface portion of said channel member, said outer surface portion being located near said partition member.

* * * * *